Jan. 13, 1970    W. E. ANSON    3,489,383
SWIVEL SUPPORT FOR A MANNEQUIN HEAD
Filed March 15, 1968
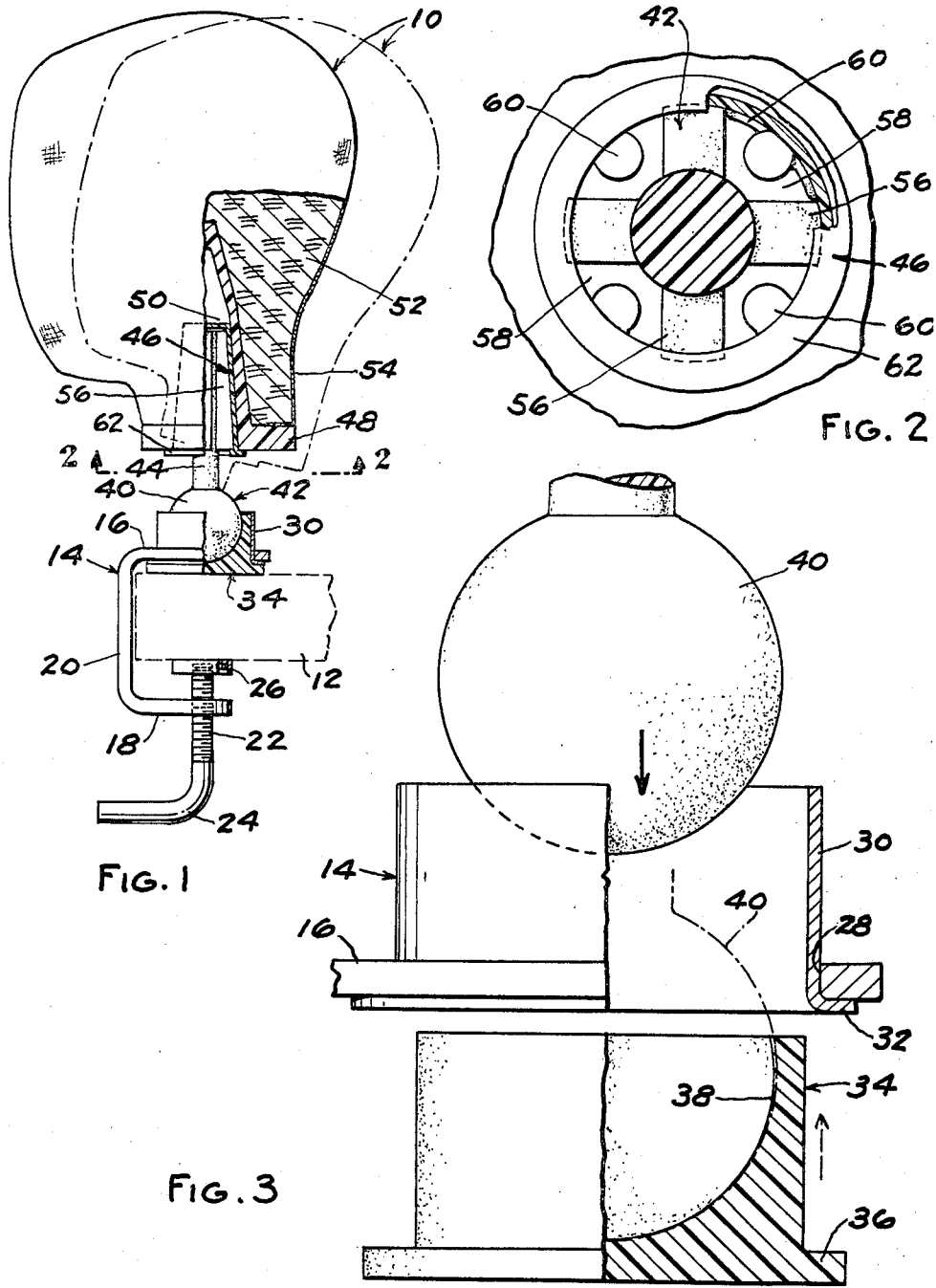
INVENTOR.
WILLIAM E. ANSON
BY
Barnes, Kisselle, Raisch & Choate
ATTORNEYS

United States Patent Office 3,489,383
Patented Jan. 13, 1970

3,489,383
SWIVEL SUPPORT FOR A MANNEQUIN HEAD
William E. Anson, Warren, Mich.
(34170 Kelly, Fraser, Mich. 48026)
Filed Mar. 15, 1968, Ser. No. 713,415
Int. Cl. A47f 5/00; F16m 11/14
U.S. Cl. 248—226                           1 Claim

ABSTRACT OF THE DISCLOSURE

A support for a mannequin head in the form of a generally C-shaped clamp on which is swivelly supported a spindle with which the mannequin head is adapted to be connected. The swivel connection includes a plastic ball and socket joint wherein the ball is press-fitted within the socket member of the joint.

---

This invention relates to a support for a mannequin head and more specifically to a clamp adapted to be secured to the top of a bench or table and having a spindle swivelly supported thereon and with which the mannequin head is adapted to be connected.

More specifically, the invention contemplates a support for a mannequin head which includes a C-shaped clamp which supports a rigid cylindrical sleeve in which a plastic socket member is telescopically arranged. The socket member is formed with a spherical socket therein in which an oversized ball at one end of a mannequin head support spindle is fitted. The relative dimensions of the ball and socket are such that, when the ball is press fitted into the socket, the plastic socket member is expanded into tight frictional engagement with the rigid sleeve and the ball is frictionally retained within the socket so that it requires the application of a force to change its position which is substantially greater than the forces to which the mannequin head is subjected when combing and setting a wig arranged thereon.

When wigs are being combed and set they are normally arranged on a mannequin head which is in turn mounted for rotative and angular adjustment on a workbench. It is not uncommon for the connection between the mannequin head and the workbench to include a swivel joint. Such swivel joints are usually of the type which include an adjustment means such as threaded screws or the like for controlling the amount of frictional resistance developed in the universal joint. Beauticians as a general rule are not too mechanically inclined and consequently adjustment of the conventional universal joint employed on supports for mannequin heads presents problems for the ordinary beautician.

It is an object of the present invention to provide a support for a mannequin head which includes a ball and socket type universal joint wherein the frictional resistance to rotative and angular movement of the stem portion of the joint is preset.

A further object of the invention resides in the provision of a support for a mannequin head which includes a universal type connection between the head supporting spindle and the base structure of the support which is of simple and economical construction and which can be readily adjusted by a beautician.

In the drawing:

FIGURE 1 is a side elevational view, with parts broken away, showing a support according to this invention clamped to a bench and supporting a mannequin head.

FIGURE 2 is a sectional view along the line 2—2 of FIG. 1.

FIGURE 3 is a fragmentary exploded view, partly in section and on an enlarged scale, showing the manner in which the components of the support are assembled.

Referring to FIG. 1 there is illustrated the mannequin head 10, or a "canvas block" as it is sometimes called, supported on the top 12 of a workbench by means of the clamp or support 14 of the present invention. Clamp 14 includes a generally C-shaped body portion having generally flat top and bottom walls 16 and 18, respectively, which are interconnected by an upright wall 20. A screw 22 bent at one end to form a handle 24 is threaded through bottom wall 18 and rotatably supports a pad 26 at its upper end. Top wall 16 is formed with a large round hole 28 which receives a metal sleeve 30. At its lower end sleeve 30 is formed with a radially outwardly extending flange 32 which abuts against the bottom face of top wall 16. If desired flange 32 may be welded to top wall 16.

Within sleeve 30 there is arranged a plastic socket member 34 fashioned with a radially outwardly extending shoulder 36 at its lower end which abuts against flange 32 to limit the extent to which socket member 34 can be pushed upwardly through sleeve 30. Socket member 34 is formed with a spherically shaped socket 38 which receives the ball 40 at the lower end of a spindle 42. As shown in FIG. 3 the vertical extent of socket 38 is only slightly greater than the radius of the socket so that the diameter of the opening at the upper end of socket member 34 is only slightly smaller than the diameter of socket 34. Spindle 42 includes a stem 44 having a plastic cap 46 at its upper end. Cap 46 is of frusto-conical shape so that its diameter is greater at its lower end than at its upper end.

The mannequin head 10 includes a rigid base 48 formed with a conical socket 50 for frictionally retaining the base on the cap 46 of the spindle 42. Head 10 includes a cork filler 52 which is covered by a canvas cloth 54. Canvas 54 is cemented, stapled or otherwise secured around its lower edge to base 48.

Ball 40 is formed of a rigid plastic or metal which does not readily distort or flow. On the other hand, socket member 34 is formed of a plastic material, such as polyethylene, which is capable of distorting or elastically flowing under pressure. Socket member 34 is molded with the diameter of socket 38 therein slightly smaller than the diameter of ball 40. The outer diameter of socket member 34 corresponds generally with the inner diameter of sleeve 30 so that the socket member can be slipped up into the sleeve through its lower end as shown in FIG. 3.

The upper end of shank 44 of spindle 42 is formed with a plurality of axially tapered ribs 56. Cap 46 is hollow and is formed on its inside with a series of grooves 58 defined by ribs 60 between which are located ribs 56 of shank 44. The open lower end of cap 46 is formed with a radial flange 62 against which the lower ends of ribs 56 abut. The radially outer portion of flange 62 abuts against the bottom face of base 48 when cap 46 is inserted in socket 50.

In assembling the device, socket member 34 is first inserted into sleeve 30 with its shoulder 36 abutting flange 32. Ball 40 cannot be readily manually inserted within socket 38 for two reasons; the diameter of socket 38 is less than the diameter of ball 40 and the vertical dimension of socket 38, which is spherical, is slightly greater than the radius of ball 40. However, since socket member 34 is formed of a material which is capable of being distorted and which elastically flows under pressure, such as polyethylene, ball 40 can be inserted in socket 34 by positioning spindle 42 vertically over socket 38 and then mechanically or hydraulically applying a vertically downward force on the upper end of the spindle. When the ball 40 has a diameter larger than the diameter of the socket 38 to an extent of about .010" to .015"

a vertical force on the upper end of spindle 42 in the amount of 200 to 300 lbs. is sufficient to drive ball 40 into socket 38 and retain it therein with considerable frictional resistance between the outer surface of the ball and the spherical surface of socket 38. By press-fitting ball 40 into socket member 34 the socket member as a whole is radially expanded into firm engagement with sleeve 30. Thus the operation of inserting ball 40 in socket 38 not only interconnects spindle 42 with socket member 34 but also provides a rigid connection between socket member 34 and sleeve 30. As a matter of fact, as long as sleeve 30 has a rather close fit with opening 28 it is not necessary to weld sleeve 30 to top wall 16 since the expansion forces on sleeve 30 resulting from insertion of ball 40 into socket 38 are sufficient to firmly retain sleeve 30 within opening 28 in top wall 16.

When the parts are assembled as described above, a relatively tight friction fit is obtained between ball 40 and socket member 34. The amount of resulting friction can be increased or decreased as desired by varying the relative dimensions of ball 40 and socket 38. Once these dimensions are fixed then the frictional resistance between ball 40 and socket 38 is preset. This frictional resistance should be sufficiently great so that head 10 will not move accidentally when the beautician is combing, setting or otherwise working on the wig. The relative dimensions of the ball and socket are preferably selected so that the position of spindle 42 is not ordinarily adjustable by manually applying a force to the spindle. However, when a mannequin head 10 is mounted on spindle 42 and a force is applied manually against the mannequin head, the mechanical advantage resulting enables adjustment of the head to any desired position (such as the broken line position shown in FIG. 1) by a force which can be easily applied to the mannequin by the beautician.

Thus it will be seen that the mannequin head support disclosed herein is not only of economical and simple construction, but also has a swivel connection wherein the tension on the ball is preset so as to eliminate problems of continually adjusting the tension on the swivel connection which is the problem encountered with prior art clamps of this type.

I claim:
1. Means for adjustably supporting a mannequin head comprising a generally C-shaped clamp having a top wall formed with a circular opening therein, a rigid sleeve extending upwardly through said opening and having a radially outwardly extending flange at its outer end seated against the lower face of said top wall, a generally cylindrical socket member formed of a plastic material which is elastically flowable under pressure, said socket member having a radially outwardly extending flange at its lower end, said socket member having a diameter generally corresponding to the inner diameter of the sleeve and being telescopically arranged within the sleeve with its flange underlying the flange of said sleeve to limit the extent of upward movement of the socket member relative to said sleeve, said socket member having a generally flat exposed top face which is substantially flush with the upper end of said sleeve, said socket member having a spherical socket therein which is open at said top face of the socket member, the vertical extent of said socket being only slightly greater than the radius of the socket so that the socket opening at said top face has a diameter only slightly less than the diameter of said socket, a spindle having a conical stem at one end for interengagement with a correspondingly recessed mannequin head, said spindle having a ball at its opposite end, said ball having a diameter greater than the initial diameter of the socket, said ball being press fitted into said socket to expand the socket member into tight frictional engagement with said sleeve, the diameters of said ball and socket being predetermined so that when assembled as described the spindle is frictionally retained in a generally rigid position and requires the application of a force to change its position which is substantially greater than the forces to which it is subjected when a mannequin head is engaged with said conical stem and a wig on the head is combed and set whereby to prevent unintentional displacement of the mannequin head.

References Cited
UNITED STATES PATENTS

| | | | |
|---|---|---|---|
| 3,198,408 | 8/1965 | Benner | 248—181 X |
| 3,389,926 | 6/1968 | Gottschald | 287—87 |

FOREIGN PATENTS 741,553   9/1943   Germany.

ROY D. FRAZIER, Primary Examiner

J. FRANKLIN FOSS, Assistant Examiner

U.S. Cl. X.R.

223—66; 248—181; 287—21, 87